United States Patent [19]
Angelo et al.

[11] Patent Number: 5,953,422
[45] Date of Patent: *Sep. 14, 1999

[54] SECURE TWO-PIECE USER AUTHENTICATION IN A COMPUTER NETWORK

[75] Inventors: Michael F. Angelo, Houston; Sompong P. Olarig, Cypress, both of Tex.

[73] Assignee: Compaq Computer Corporation, Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/774,809

[22] Filed: Dec. 31, 1996

[51] Int. Cl.[6] .............................. H04K 1/00; H04L 9/00
[52] U.S. Cl. .................................. 380/23; 380/25; 380/49
[58] Field of Search ................................... 380/23, 25, 49

[56] References Cited

U.S. PATENT DOCUMENTS

| | | | |
|---|---|---|---|
| 4,405,829 | 9/1983 | Rivest et al. | 380/30 |
| 4,799,258 | 1/1989 | Davies | 380/21 |
| 4,890,323 | 12/1989 | Beker et al. | 380/25 |
| 5,276,737 | 1/1994 | Micali | 380/30 |
| 5,315,658 | 5/1994 | Micali | 380/30 |
| 5,375,243 | 12/1994 | Parzych et al. | 395/725 |
| 5,389,738 | 2/1995 | Piosenka et al. | 174/52.4 |
| 5,511,122 | 4/1996 | Atkinson | 380/25 |
| 5,537,540 | 7/1996 | Miller et al. | 395/183.14 |
| 5,590,199 | 12/1996 | Krajewski et al. | 380/25 |

*Primary Examiner*—Gail O. Hayes
*Assistant Examiner*—Hrayr A. Sayadian
*Attorney, Agent, or Firm*—Akin, Gump, Strauss, Hauer & Feld, LLP

[57] ABSTRACT

A computer system incorporating a two-piece authentication procedure for securely providing user authentication over a network. In the disclosed embodiment of the invention, a user password is entered during a secure power-up procedure. The user password is encrypted by an external token or smart card that stores an encryption algorithm furnished with an encryption key that is unique or of limited production. A network password is thereby created. The network password is maintained in a secure memory space such as System Management Mode (SMM) memory. The network password is then encrypted and communicated over the network. The network password may be encrypted using the server's public key or another key that is known to the server. Optional node identification information is appended to the network password prior to communication over the network. Once received by the server, the encrypted network password is decrypted using the server's private key. A user verification process is then performed on the network password to determine which, if any, access privileges have been accorded the network user.

20 Claims, 4 Drawing Sheets

SECURE TWO-PIECE USER AUTHENTICATION IN A COMPUTER NETWORK

BACKGROUND OF THE INVENTION

1. Field of the Invention

The invention relates to security in a computer system, and more particularly to using a cryptographic token to provide two-piece user authentication in a computer network.

2. Description of the Related Art

Today's businesses invest large amounts of money in hardware and software, and even more money is spent developing information contained in data files such as text documents and spreadsheets. Protecting such investments can be critical to the success and reputation of a business. Public accounts of the exploits of computer "hackers"—as malicious code-breakers or eavesdroppers are sometimes called—have therefore focused and magnified corporate desires for secure communications and better methods of protecting data. The scope of the problem is undoubtedly even more serious than reported, given the reluctance of many businesses to report security breaches. As a result, security conscious users are requesting that security and integrity features be incorporated into their computer networks to restrict access to data contained on hard drives, as well as information contained in other critical network components.

One known approach to security involves encryption or cryptography. Cryptography is typically used to protect both data and communications. Generally, an original message or data item is referred to as "plain text", while "encryption" denotes the process of disguising or altering a message in such a way that its substance is not readily discernable. An encrypted message is called "ciphertext". Ciphertext is returned to plain text by an inverse operation referred to as "decryption". Encryption is typically accomplished through the use of a cryptographic algorithm, which is essentially a mathematical function. The most common cryptographic algorithms are key-based, where special knowledge of variable information called a "key" is required to decrypt ciphertext. There are many types of key-based cryptographic algorithms, providing varying levels of security.

The two most prevalent cryptographic algorithms are generally referred to as "symmetric" (also called secret key or single key algorithms) and "public key" (also called asymmetric algorithms). The security in these algorithms is centered around the keys—not the details of the algorithm itself. This makes it possible to publish the algorithm for public scrutiny and then mass produce it for incorporation into security products.

In most symmetric algorithms, the encryption key and the decryption key are the same. This single key encryption arrangement is not flaw-free. The sender and recipient of a message must somehow exchange information regarding the secret key. Each side must trust the other not to disclose the key. Further, the sender must generally communicate the key via another media (similar to a bank sending the personal identification number for an ATM card through the mail). This arrangement is not practical when, for example, the parties interact electronically for the first time over a network. The number of keys also increases rapidly as the number of users increases.

With public key algorithms, by comparison, the key used for encryption is different from the key used for decryption. It is generally very difficult to calculate the decryption key from an encryption key. In typical operation, the "public key" used for encryption is made public via a readily accessible directory, while the corresponding "private key" used for decryption is known only to the recipient of the ciphertext. In an exemplary public key transaction, a sender retrieves the recipient's public key and uses it to encrypt the message prior to sending it. The recipient then decrypts the message with the corresponding private key. It is also possible to encrypt a message using a private key and decrypt it using a public key. This is sometimes used in digital signatures to authenticate the source of a message.

One problem with public key algorithms is speed. Public key algorithms are typically on the order of 1,000 times slower than symmetric algorithms. This is one reason that secure communications are often implemented using a hybrid cryptosystem. In such a system, one party encrypts a random "session key" with the other party's public key. The receiving party recovers the session key by decrypting it with his/her private key. All further communications are encrypted using the same session key (which effectively is a secret key) and a symmetric algorithm.

The number of cryptographic algorithms is constantly growing. The two most popular are DES (Data Encryption Standard) and RSA (named after its inventors—Rivest, Shamir, and Adleman). DES is a symmetric algorithm with a fixed key length of 56 bits. RSA is a public key algorithm that can be used for both encryption and digital signatures. DSA (Digital Signature Algorithm) is another popular public key algorithm that is only used for digital signatures. With any of these algorithms, the relative difficulty of breaking an encrypted message by guessing a key with a brute force attack is proportional to the length of the key. For example, if the key is 40 bits long, the total number of possible keys ($2^{40}$) is about 110 billion. Given the computational power of modem computers, this value is often considered inadequate. By comparison, a key length of 56 bits provides 65,636 times as many possible values as the 40 bit key.

Much attention has been given to protecting and authenticating communications and data as they are transmitted via internal corporate networks (intranets or LANs) and external networks (such as the Internet). One known method of offering limited access to a networked computer is through the use of passwords. A password is typically stored in a computer's battery-backed CMOS RAM memory. Before the user is allowed access to the computer or secured computer resources, the user is required to enter a password. Once a password is entered, the computer's power-on routine compares the password to the password in CMOS memory and, if they match, the user is allowed access. A main disadvantage of this system is that certain forms of attack can bypass the CMOS memory because in many cases it is not read protected. While generally effective, password protection is one-piece in nature and is only as secure as the password itself Physical keys or tokens, such as those used to unlock a door, have also been used to permit access to a computer system. Like the password approach, this type of security is "one-piece" in nature, and is compromised if the key or token is stolen. Anyone possessing the key can gain access to the computer network and is accorded the same level of access as an authorized user. Currently, there exists no satisfactory method of verifying user identity in granting access privileges in a distributed computing environment.

SUMMARY OF THE INVENTION

Briefly, a computer system according to the present invention utilizes a two-piece authentication procedure to securely provide user authentication over a network. In the disclosed embodiment of the invention, a password entry process is carried out during a secure power-up procedure. At some point during the secure power-up procedure, the computer system checks for the presence of an external token or smart card that is coupled to the computer through specialized hardware. The token or smart card is used to store an encryption algorithm furnished with an encryption key that is unique or of limited production.

Following detection of the external token, the computer user is required to enter a plain text user password. Once entered, the user password is encrypted using the encryption algorithm (or a one-way hash function) contained in the external token, thereby generating a "network" password. The network password is maintained in a secure memory space such as System Management Mode (SMM) memory. When the user desires to access a network resource such as a hard drive in a server, the network password is encrypted and communicated over the network. In the case of a server hard drive, the network password is encrypted using the server's public key (or another key that is known to the server). Optional session key or node identification information is appended to the network password prior to communication over the network. The node identification information can be used for a variety of purposes, including limiting access to certain pieces of data to specified users on specified machines.

Once received by the server, the encrypted network password is decrypted using the server's private key. A user verification process is then performed on the network password to determine which, if any, access privileges have been accorded the network user. As an example, access to certain pieces of data can be limited to a specified user on a specified network node. Numerous other uses are contemplated for the network password. The password can be utilized: to decrypt or encrypt data on the server hard drive (similar to a session key), as part of a public key/private key pair, or as part of a split key or forced key pair. Such uses permit the server hard drive(s) or other network resources to be securely compartmentalized with the option to have multiple user levels.

In an alternate embodiment of the invention, entry of the user password and encryption by the token is conducted during normal computer operation outside of the secure power-on sequence. In this embodiment of the invention, the user password is entered by means of a secure keyboard communications channel. Again, the network password is maintained in either secure system memory or in a secured resource such as a hard drive. In any of the various embodiments of the invention, the two-piece nature of the authentication process assures that if either the user password or the external token is stolen, it is of little value. Both pieces are required to access protected resources and uniquely identify a user to the network. Further, a network user's identity is maintained when working on different machines.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

The following patents and applications are hereby incorporated by reference:

Commonly-assigned U.S. Pat. No. 5,537,540, entitled "TRANSPARENT, SECURE COMPUTER VIRUS DETECTION METHOD AND APPARATUS", referred to as the "SAFESTART patent";

Commonly-assigned U.S. patent application Ser. No. 08/396,343, entitled, "SECURITY CONTROL FOR A PERSONAL COMPUTER," filed on Mar. 3, 1995;

Commonly-assigned U.S. Pat. No. 5,375,243, entitled "HARD DISK PASSWORD SECURITY SYSTEM";

Commonly-assigned U.S. patent application Ser. No. 08/657,982, entitled "METHOD AND APPARATUS FOR PROVIDING SECURE AND PRIVATE KEYBOARD COMMUNICATIONS IN COMPUTER SYSTEMS", filed on May 29, 1996; and Commonly-assigned U.S. patent application Ser. No. 08/766,721, entitled "A METHOD AND APPARATUS FOR ALLOWING ACCESS TO SECURED COMPUTER RESOURCES BY UTILIZING A PASSWORD AND EXTERNAL ENCRYPTION ALGORITHM", filed on Dec. 13, 1996.

Figure 1:
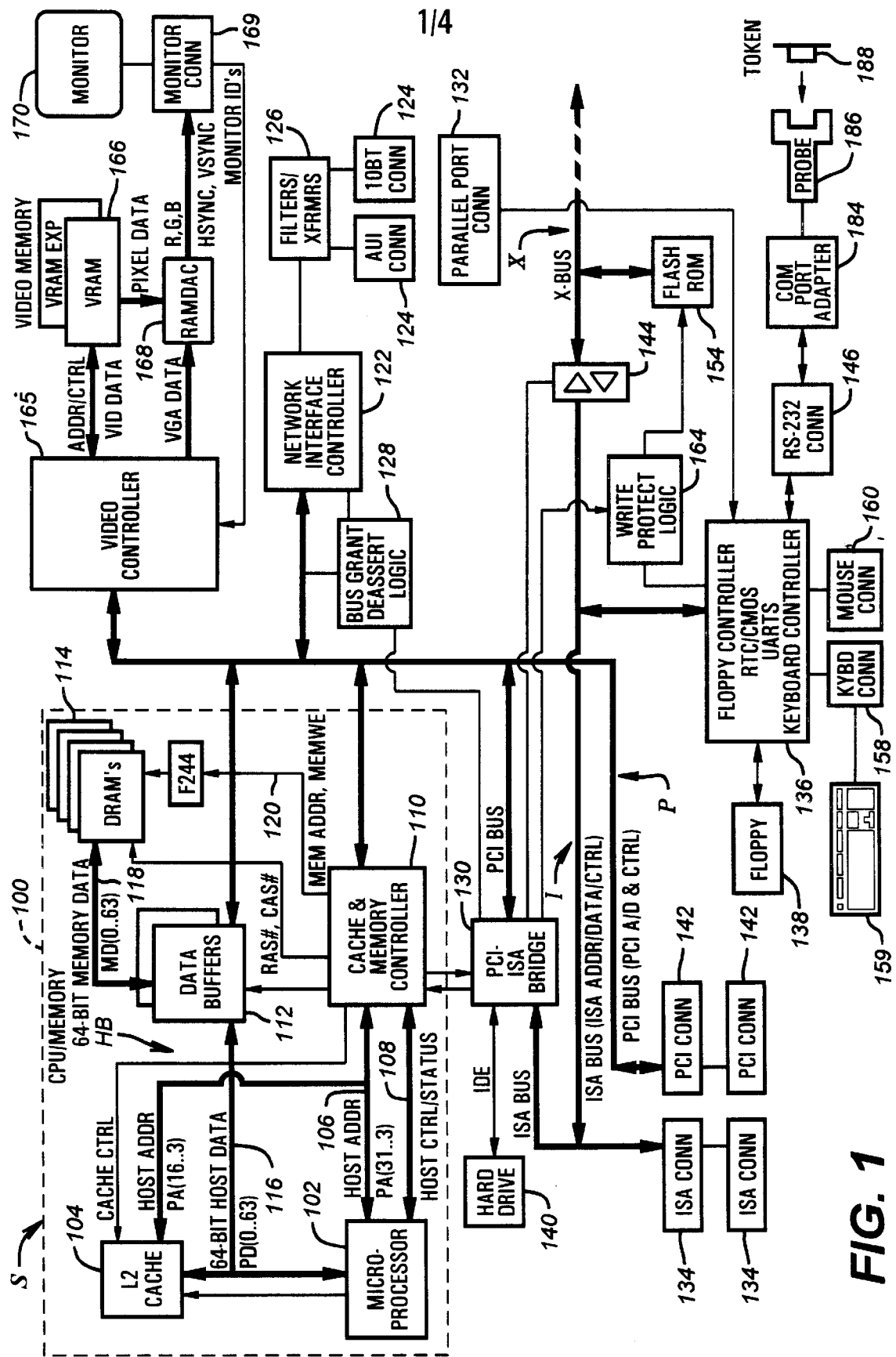
FIG. 1 is a schematic block diagram of a computer system incorporating capabilities for two-piece user authentication according to the present invention.

Referring first to FIG. 1, a computer system S according to the present invention is shown. In the preferred embodiment, the system S incorporates two primary buses: a Peripheral Component Interconnect (PCI) bus P which includes an address/data portion and a control signal portion; and an Industry Standard Architecture (ISA) bus I which includes an address portion, a data portion, and a control signal portion. The PCI and ISA buses P and I form the architectural backbone of the computer system S.

A CPU/memory subsystem 100 is connected to the PCI bus P. The processor 102 is preferably the Pentium® processor from Intel Corporation, but could be an 80486 or any number of similar or next-generation processors. The processor 102 drives data, address, and control portions 116, 106, and 108 of a host bus HB. A level 2 (L2) or external cache memory 104 is connected to the host bus HB to provide additional caching capabilities that improve the overall performance of the computer system S. The L2 cache 104 may be permanently installed or may be removable if desired. A cache and memory controller 110 and a PCI-ISA bridge chip 130 are connected to the control and address portions 108 and 106 of the host bus HB. The cache and memory controller chip 110 is configured to control a series of data buffers 112. The data buffers 112 are preferably the 82433LX from Intel, and are coupled to and drive the host data bus 116 and a MD or memory data bus 118 that is connected to a memory array 114. A memory address and memory control signal bus is provided from the cache and memory controller 110.

The data buffers 112, cache and memory controller 110, and PCI-ISA bridge 130 are all connected to the PCI bus P. The PCI-ISA bridge 130 is used to convert signals between the PCI bus P and the ISA bus I. The PCI-ISA bridge 130 includes: the necessary address and data buffers, arbitration and bus master control logic for the PCI bus P, ISA arbitration circuitry, an ISA bus controller as conventionally used in ISA systems, an IDE (intelligent drive electronics) interface, and a DMA controller. A hard disk drive 140 is connected to the IDE interface of the PCI-ISA bridge 130. Tape drives, CD-ROM devices or other peripheral storage devices (not shown) can be similarly connected.

In the disclosed embodiment, the PCI-ISA bridge 130 also includes miscellaneous system logic. This miscellaneous system logic contains counters and activity timers as conventionally present in personal computer systems, an interrupt controller for both the PCI and ISA buses P and I, and power management logic. Additionally, the miscellaneous system logic may include circuitry for a security management system used for password verification and to allow access to protected resources as described more fully below.

The PCI-ISA bridge 130 also includes circuitry to generate a "soft" SMI (System Management Interrupt), as well as SMI and keyboard controller interface circuitry. The miscellaneous system logic is connected to the flash ROM 154 through write protection logic 164. Separate enable/interrupt signals are also communicated from the PCI-ISA bridge 130 to the hard drive 140. Preferably, the PCI-ISA bridge 130 is a single integrated circuit, but other combinations are possible.

A series of ISA slots 134 are connected to the ISA bus I to receive ISA adapter cards. A series of PCI slots 142 are similarly provided on the PCI bus P to receive PCI adapter cards.

A video controller 165 is also connected to the PCI bus P. Video memory 166 is used to store graphics data and is connected to the video graphics controller 165 and a digital/analog converter (RAMDAC) 168. The video graphics controller 165 controls the operation of the video memory 166, allowing data to be written and retrieved as required. A monitor connector 169 is connected to the RAMDAC 168 for connecting a monitor 170.

Figure 2:
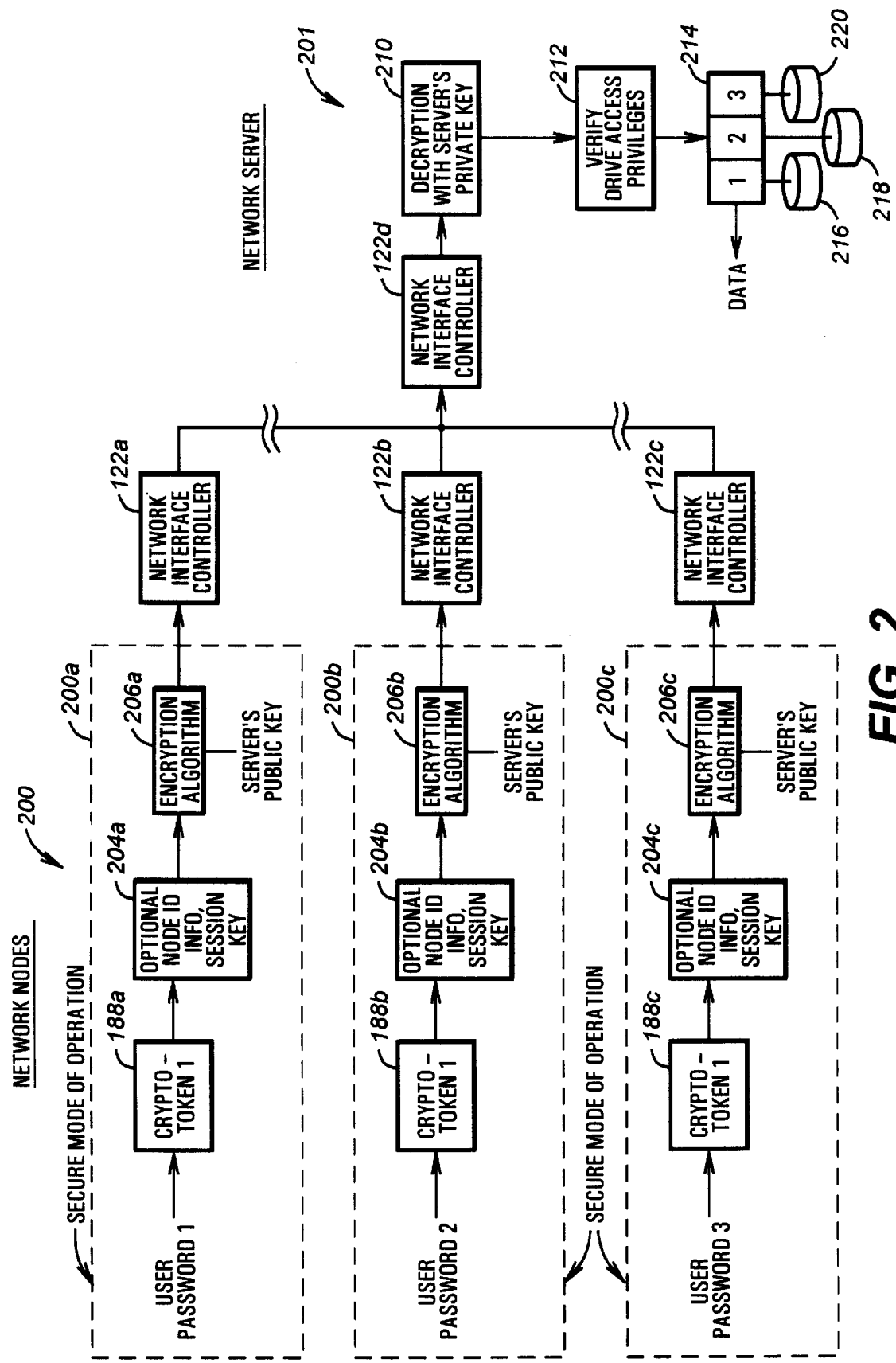
FIG. 2 is a schematic block diagram of a local area network illustrating secure user authentication and remote peripheral access according to the present invention.

A network interface controller (NIC) 122 is also connected to the PCI bus P, allowing the computer system S to function as a "node" on a network. Preferably, the controller 122 is a single integrated circuit that includes the capabilities necessary to act as a PCI bus master and slave, as well as circuitry required to act as an Ethernet interface. Attachment Unit Interface (AUI) and 10 base-T connectors 124 are provided in the system S, and are connected to the NIC 122 via filter and transformer circuitry 126. This circuitry forms a network or Ethernet connection for connecting the computer system S to a distributed computer environment or local area network (LAN) as shown in FIG. 2.

A combination I/O chip 136 is connected to the ISA bus I. The combination I/O chip 136 preferably includes a real time clock, two UARTS, a floppy disk controller for controlling a floppy disk drive 138, and various address decode logic and security logic to control access to an internal or external CMOS/NVRAM memory (not shown) and stored password values. Further details of contemplated uses of the NVRAM memory are provided below. Additionally, a control line is provided to the read and write protection logic 164 to further control access to the flash ROM 154. Serial port connectors 146 and parallel port connector 132 are also connected to the combination I/O chip 136.

An 8042, or keyboard controller, is also included in the combination I/O chip 136. The keyboard controller is of conventional design and is connected in turn to a keyboard connector 158 and a mouse or pointing device connector 160. A keyboard 159 is connected to the computer system S through the keyboard connector 158.

A buffer 144 is connected to the ISA bus I to provide an additional X-bus X for various additional components of the computer system S. A flash ROM 154 receives its control, address and data signals from the X-bus X. Preferably, the flash ROM 154 contains the BIOS information for the computer system and can be reprogrammed to allow for revisions of the BIOS.

In the disclosed embodiment, the computer system S contains circuitry for communicating with a removable cryptographic token 188. The precise physical nature of the token 188 is not considered critical to the invention. The token can take many forms, such as a Touch Memory™ device supplied by Dallas Semiconductor, Inc., a smart card, or an encryption card. Preferably, the token 188 is easily decoupled from the computer system S and easily transportable by the token bearer. The token 188 contains at least one of a variety of encryption algorithms (such as DES, Blowfish, elliptic curve-based algorithms, etc.). Although the base algorithm can be the same in each token 188, it is preferable that the encryption key be different in each token 188. Ideally, the token 188 is capable of communicating digitally with the computer system S during momentary contact with or proximity to the computer system S. The token 188 of the disclosed embodiment is capable of storing the encryption algorithm in a non-volatile manner and can be permanently write-protected to discourage tampering.

In the disclosed embodiment of the invention, the circuitry used for establishing a communication link between the token 188 and the computer system S consists of a probe 186 connected to a COM or serial port adapter 184. The port adapter 184 is connected to the RS232 connector 146. Alternatively, the port adaptor 184 could interface with an application specific integrated circuit (ASIC). In operation, the token 188 is detachably received by the probe 186. The probe 186 includes circuitry for reading and writing memory in the token 188, and can be fully powered through the RS232 connector 146. In addition, the probe 186 includes presence detector circuitry for ascertaining the presence of a token 188.

An additional feature of the computer system S is a System Management Mode (SMM), as discussed at length below in conjunction with FIG. 3. It is also noted that FIG. 1 presents an exemplary embodiment of the computer system S and it is understood that numerous other effective embodiments could readily be developed as known to those skilled in the art.

Referring now to FIG. 2, a distributed access environment illustrating secure user authentication and remote peripheral access according to the present invention is shown. Two-piece entry of a user password at a network node 200 results in a network password that is securely distributed to over the network to allow access to remote peripherals. In the disclosed embodiment, the secured remote peripheral takes the form of networked hard drives 216, 218 and 220, although access to any secured network resource falls within the scope of the invention.

The user authentication process occurs similarly in each network node 200, and the description of the process for a single node 200*a* is provided for sake of clarity. In the disclosed embodiment of the invention, a password entry process is carried out during a secure power-up procedure or other secure mode of operation as detailed more specifically in conjunction with FIGS. 4A and 4B. During the secure power-up procedure, the computer system S checks for the presence of an external cryptographic token or smart card 188*a* that is used to store an encryption algorithm furnished with a unique encryption key and optional identification information.

Following detection of the external token 188a, the computer user is required to enter a plain text user password. Once entered, the user password is encrypted using an encryption algorithm contained in the external token 188a, thereby generating a "network" password. Alternatively, the the external token 188a can generate the network password by performing a one-way hash function on the user password. In either case, the network password is maintained in a secure memory space such as SMM memory 250 (see FIG. 3). When the user desires to access a network resource such as a hard drive in a server 201, the network password is appended with an optional session key, the user's public key, or node identification information 204a. The node identification information can be used for a variety of purposes, including limiting access to certain pieces of data to specified users on specified machines. The network password and node information are then encrypted by an encryption algorithm 206a.

The encryption algorithm 206a can take many forms, including all of the aforementioned algorithms. If a public key/private key algorithm is used, the network server's public key is used with encryption algorithm 206a. The disclosed encryption scheme allows the encrypted network password to be communicated over an unsecured network in such a manner that it is only decipherable by the targeted network server 201.

Following encryption with the server's public key, the encrypted network password it communicated to the network server 201 via network interface controllers 122a and 122d. The encrypted network password is then decrypted (at element 210) with the server's private key to retrieve the network password. After the network password and any optional session key or node identification information has been decrypted, it is forwarded to a verification process 212 to determine the user's access privileges to hard drives 216, 218, and 220.

The verification process can take many forms, including an indexed look-up table in which multiple network passwords (in conjunction with any node identification information) are granted the same or a variety of access privileges. Numerous other uses are contemplated for the network password. For example, the password or any appended session keys can be utilized to decrypt or encrypt data on one of the hard drives 216–220 through interface circuitry 214, or as an enablement signal to a password protected device such as the disk drive described in the previously incorporated "HARD DISK PASSWORD SECURITY SYSTEM."

A one-way hash function or an encryption algorithm can also be used to convert the network password into a pseudo-random seed (intermediate key). The pseudo-random seed could then be used by a deterministic system to generate a public-key/private-key key pair. A common cryptographic algorithm used to generate such keys is DES, but many other algorithms suffice.

As mentioned, optional keys such as a session key or the user's public key can be appended to the network password prior to its transmission over the network. When an appended session key is provided to the network server 201, subsequent communications between the network node 200a and the network server 201 are encrypted with a symmetric algorithm using the session key. Encryption and decryption with symmetric algorithms is typically much faster than encryption and decryption with public key algorithms.

Alternatively, the network password could be configured as a subset of a current "super key" by using split key technology. Split key technology refers generally to the process of "splitting" a master key and distributing the portions such that access is contingent upon the presence of different portions. For example, the network server 201 can maintain one piece of the administrative super key and require that a valid network password (the other portion of the split key) be appended before access privileges are granted. The administrative super key can be broken up in different ways, such that multiple network users having different user passwords and unique tokens 188 can access the same secured network resource. The administrative super key can be altered to encompasses additional network passwords as the need arises. Further details of split key technology can be found in U.S. Pat. Nos. 5,276,737 and 5,315,658 entitled "FAIR CRYPTOSYSTEMS AND METHODS FOR USE" by Silvio Micali, each of which is hereby incorporated by reference.

It is also contemplated that the tokens 188 themselves can incorporate identification informnation in addition to the encryption algorithm, allowing users to have different tokens for different activities—much like a person having checking and saving accounts that are accessible by the same personal identification number (PIN). Further, the NIC 122a is capable of appending node identification information to the encrypted network password.

Such uses of the disclosed two-piece user authentication process permit the server hard drives 216–220 or other network resources to be securely compartmentalized with the option to have multiple user levels. This arrangement has many potential applications. For example, a company might not want certain documents to be downloaded outside facility. The invention allows access privileges to be limited to specified nodes 200 within the facility, proving an additional level of security.

The System Management Mode

Figure 3:
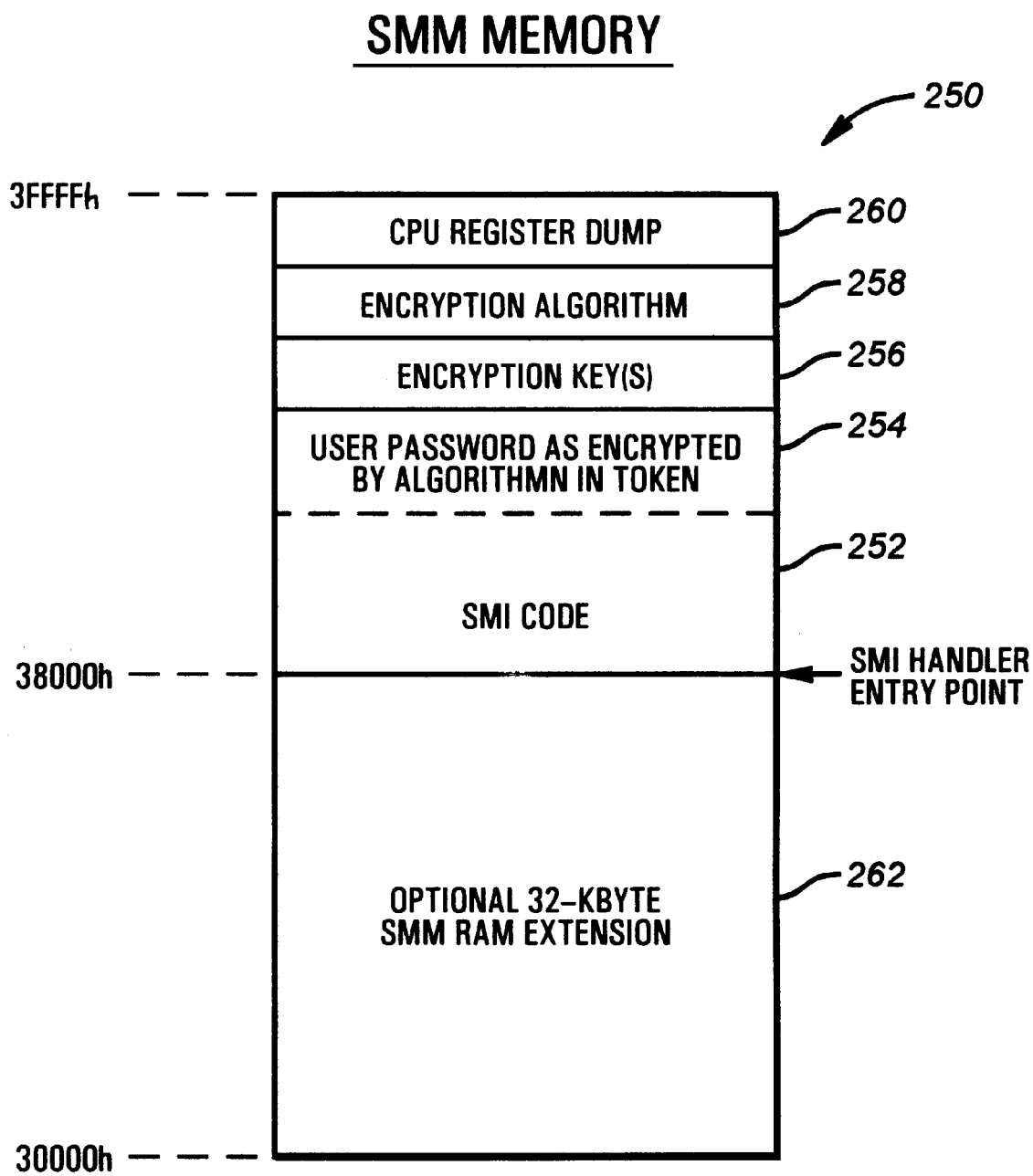
FIG. 3 is graphical representation of System Management Mode memory according to the present invention.

Referring now to FIG. 3, certain microprocessors, such as the Pentium® processor from Intel Corporation, include a mode referred to as System Management Mode (SMM), which is entered upon receipt of a system management interrupt (SMI). Originally, SMIs were power management interrupts devised by Intel Corporation for portable systems. Portable computers often draw power from batteries which provide a limited amount of energy. To maximize battery life, an SMI is typically asserted to turn off or reduce the power to any system component that is not currently in use. Although originally meant for laptop computers, SMIs have become popular for desktop and other stationary models as well.

SMIs are asserted by either an SMI timer, by a system request, or by other means. An SMI is a non-maskable interrupt having almost the highest priority in the system. Only the reset signal R/S* and cache flush signal FLUSH*, which can be conceptualized as interrupts, have a higher priority than the SMI. When an SMI is asserted, a microprocessor maps a portion of memory referred to as SMM memory 250 into the main memory space. The entire CPU state is then saved in the SMM memory 250 (in the CPU register dump 260 of FIG. 3) in stack-like, last in/first out fashion. After the initial processor state is saved, the processor 102 begins executing an SMI handler routine 252, which is an interrupt service routine to perform specific system management tasks such as reducing power to specific devices or, as in the case of the present invention, providing security services. While the routine is executed, other interrupt requests are not serviced, and are ignored until the interrupt routine is completed or the microprocessor is reset. When the SMI handler 252 completes its task, the processor state is retrieved from the SMM memory 250, and the main program continues. An SMI active signal referred to as the SMIACT* signal is provided by the processor to indicate operation in SMM.

As mentioned, following assertion of its SMI input (this is generally an active low signal), the processor 102 calls the SMI handler 252, which addresses an address space that is separate from ordinary main memory. Thereafter, all memory accesses refer only to SMM memory 250. Input/output ("I/O") accesses via instructions such as IN or OUT are still directed to the normal I/O address space, however. One advantageous side-effect of the hardwired separate address SMM area is that the routines stored in this space cannot be snooped by the cache, providing an additional layer of protection.

In a typical system management mode implementation, it is intended that battery-backed SRAM chips be mapped into the address space between 30000h and 3ffffh by default. External hardware can use the SMIACT* signal as a chip select signal and thereby address either the SRAM chips (the SMIACT* signal is at a logic low level), or the normal main memory (the SMIACT* signal is at a logic high level). By using the SMIACT* signal, then, SMM memory 250 and normal memory can be strictly separated.

Referring more specifically to FIG. 3, a graphical representation of SMM memory 250 as configured according to the present invention is shown. As mentioned above, this address space is addressed by the processor 102 following an SMI. Following an SMI, the state of the processor 102 is stored in the CPU register dump 260. The SMI handler 252 is then called and executed by the processor 102. Importantly, the SMI handler 252 can be written such that it performs tasks other than power-down operations. An SMI handler 252 written according to the present invention is able to utilize the encrypted user password (network password) 254, encryption keys 256, and an encryption algorithm 258 to securely perform encryption operations that allow a user's identity to be verified over a LAN. Because SMM memory 250 is only addressable while the computer system is in SMM, storing the encrypted user password 254, encryption keys 256 and encryption algorithm 258 in SMM memory 250 prevents malicious code from modifying or reading these sensitive components of the disclosed embodiment of the invention. The optional 32-Kbyte SMM RAM extension 262 can be utilized for securely performing encryption functions or to store additional encryption keys.

Figure 4A:
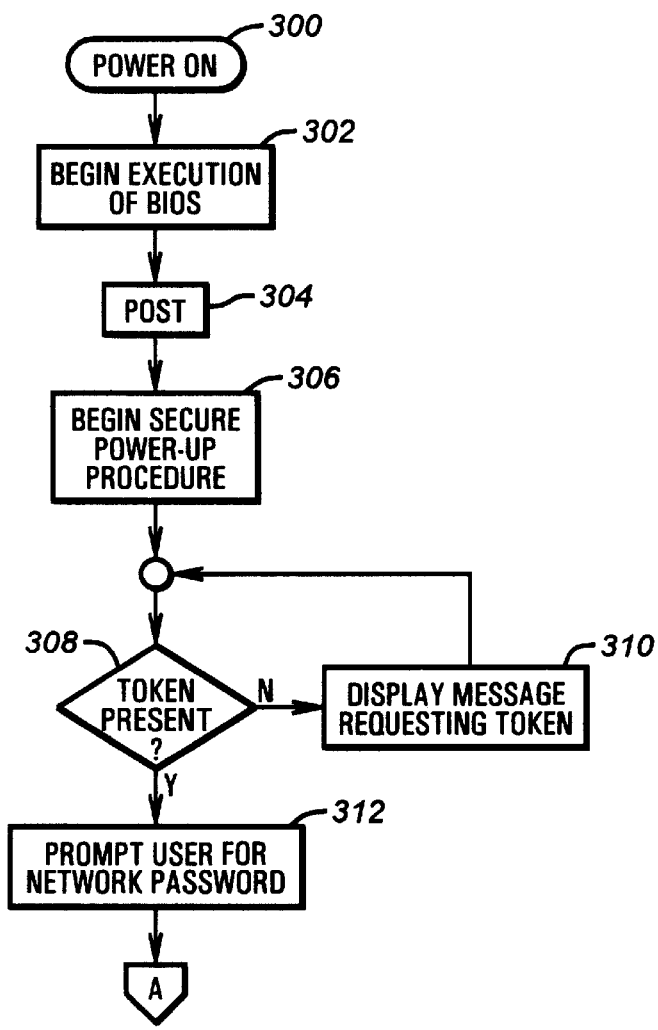
FIGS. 4A and 4B are flowchart diagrams illustrating a two-piece procedure according to the present invention for entering password information during a secure power-up procedure.
Figure 4B:
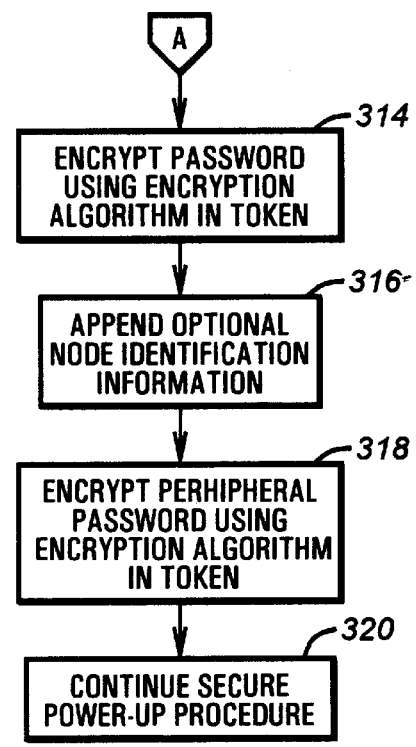

Referring now to FIG. 4A and 4B, an exemplary power-on sequence incorporating two-piece user verification according to the invention is shown. The sequence builds upon a secure power-up procedure, such as that described in the SAFESTART patent. Briefly, this invention reduces the administrative requirements of earlier secure power-on techniques. A reserved non-DOS hard disk partition is used to pre-boot the computer system S and provide a secure environment from which to verify files. Upon power-up or reset, the computer performs the power-on self test (POST), during which it checks a SAFESTART track by comparing its hash value to a value stored in NVRAM. If the integrity of the SAFESTART track is verified, the first "SAFESTART" routine is loaded into memory and executed.

The SAFESTART routine first checks the master boot record and boot sectors of the hard disk. This verification captures a large majority of viruses and is performed before any code residing in those areas is executed, thus preventing the spread of any discovered viruses. Further checks are performed on SAFESTART files before each is executed. Eventually, system files and any additional designated user files are verified. Since the computer system was booted from an atypical partition, the drives are remapped to account for the shift in logical disk drive addressing. When the verification process is completed, SAFESTART files are cleaned up, a latch is set to prevent unauthorized modification of the initial hash values, and control is returned to the BIOS to boot the user operating system. Thus, a computer system implemented according to the SAFESTART patent insures that designated software and passwords are trustworthy following a power-up cycle.

As shown in FIG. 2A, when power to the computer system S is initially applied or the system undergoes a cold restart, the POWER-ON sequence 300 is commenced. In the first step 302 of the POWER-ON sequence 200 the computer system S begins executing from BIOS ROM. The BIOS is preferably stored in flash ROM 154 and contains low level programming for booting the operating system, and an interrupt handler for accessing the hard drive 140. Control then proceeds to step 304 where the computer system S performs a power-on self test (POST) to determine if all system hardware is operating properly.

Following additional power-on steps (optional), control next proceeds to step 306 for commencement of a secure power-up procedure such as that described in the SAFESTART patent. In the preferred embodiment, operating sequences for the secure power-up procedure are configured as an option ROM and located in the option ROM address space in a conventional manner. Preferably, the operating sequences are provided as the last option ROM in order to allow any other option ROM's to be installed at the outset. The system BIOS executes this portion of the secure power-on sequence as a part of its scan for option ROMs, which are executed when encountered in POST. This arrangement requires address decoding for the power-on sequence, but also simplifies distribution into a family of computer systems. Alternatively, the power-on sequence could be implemented as a direct call from the BIOS, rather than an option ROM call.

Control next proceeds to step 308 to determine if a token 188 containing an encryption algorithm is present. If the aforementioned presence detection circuitry determines that a token is not present, control loops to step 310 to display a message requesting that the user provide a token 188. When a token 188 is present as determined in step 308, control passes to step 312 where the user is prompted to enter a plain text user password. As an alternative to a memorized value, the plain text password could be generated with the aid of biometrics. For example, a scanned fingerprint could be converted into a plain text password value. It is noted that the precise ordering of steps 308–312 is not considered critical to the invention.

Control next proceeds to step 314 of FIG. 4B and the user password is encrypted using the encryption algorithm provided by the external token 188. The encrypted plain text password effectively becomes the network password. The encryption algorithm that is utilized by the token 188 can take many forms, including DES, RSA, DSA, RC2, RC4, Blowfish, IDEA, 3-WAY, and MDC among others. Ideally, the algorithm in each token 188 is enabled by an encryption key that is unique or of limited production, such that it is impractical or impossible to circumvent the verification process by using a substitute token.

It is contemplated that the actual encryption process could be carried out by the token 188 itself In this embodiment of the invention, the user password is transmitted to the token 188 through the RS232 connector 146 or alternate connection port. The token 188 then performs the encryption function using its stored encryption algorithm and associated encryption key. Following the encryption process, the encrypted password is returned to the computer system S via the RS232 connector 146.

In an alternate embodiment of the invention, the encryption algorithm is downloaded into computer memory. After the user password has been entered, the encryption function is then performed by the computer system S. In this embodiment of the invention, it is desirable that the encryption algorithm be erased from the computer memory after completion of the encryption process and while the computer system S is still in the secure power-on period. This step prevents the encryption algorithm from being surreptitiously obtained from memory following the secure power-on period.

Following creation of the network password, control proceeds to step 316 and optional node identification information (or a session key) is appended. As mentioned above, node identification information allows the network server 201 to determine which node is being utilized and grant access privileges accordingly. The optional node identification information can be appended prior to the encryption process of step 314. In either case, control next proceeds to step 318 and the network password and any appended node identification information are stored in secure memory such as SMM memory 250. The network password could also be maintained in protected/locked NVRAM or Flash ROM 154, or in some other secure memory such as that disclosed in the previously incorporated "SECURITY CONTROL FOR A PERSONAL COMPUTER." Following this step, control proceeds to step 320 and the secure power-up procedure is continued.

It should be observed that in each of the embodiments of the invention described above, the user authentication or password verification process is two-piece in nature. If either the user password or the external token is misappropriated, it is of little value. Both pieces are required to generate the network password. In addition, the scope of the invention not considered to be limited to the disclosed secure power-up procedure. Likewise, the precise ordering of the power-up steps is not considered critical to the invention.

In one alternate embodiment of the invention, the two-piece authentication process is conducted during normal computer operation outside of the secure power-on sequence. In this embodiment of the invention, the user password is communicated to secure memory by means of a secure keyboard communications channel such as that described in previously incorporated "METHOD AND APPARATUS FOR PROVIDING SECURE AND PRIVATE KEYBOARD COMMUNICATIONS IN COMPUTER SYSTEMS." Briefly, a request for secure keyboard communications causes the computer's processor to enter into SMM. The SMI handler then directs specialized hardware to intercept and divert keyboard interrupts, such that data entered via the keyboard is only communicated to secure, non-readable memory. The secured keyboard communications channel prevents the user's plain text password from being intercepted by malicious software code, such as a virus masquerading as a screen saver or device driver.

Thus, a method has been described for permitting secure user authentication and remote peripheral access based upon a two-piece user verification process. In the disclosed embodiment of the invention, the user verification process begins during a secure power-up procedure. At some point during the secure power-up procedure, the computer user is required to provide an external token or smart card. The token or smart card is used to store an encryption algorithm furnished with an encryption key that is unique or of limited production. The computer user is then required to enter a plain text user password. Once entered, the user password is encrypted using the encryption algorithm contained in the external token to create a network password. When the network user desires to access a secured network resource, the network password is then encrypted using the network server's public key before being communicated over the network. Once received by the server, the encrypted network password is decrypted using the server's public key. A user verification process is then performed on the network password to determine which, if any, access privileges have been accorded the network user. Optional node identification information can be appended to the network password to provide additional levels of access. The two-piece nature of the authentication process assures that if either the user password or the external token is stolen, it is of little value. Both pieces are required to access protected resources and uniquely identify a user to the network.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A method for securely authenticating user identity in a computer network including a network server coupled to at least one network node capable of communicating with an external token that includes a cryptographic algorithm and an encryption key, the network node further incorporating a secure memory and an associated secure operating mode independent from the general memory and operating mode of the network node, the method comprising the steps of:

placing the network node into the secure operating mode, and while in the secure operating mode, performing the steps of:
receiving a user password from a user in the network node;
communicatively coupling the external token to the network node;
providing the user password to the cryptographic algorithm stored in the token;
encrypting the user password with the cryptographic algorithm and the encryption key to produce a network password;
storing the network password within the secure memory; and
exiting the secure operating mode; and performing the following steps for network access:
encrypting the network password stored in secure memory using a network server public key creating an encrypted network password;
communicating the encrypted network password to the network server;
decrypting the encrypted network password in the network server using a network server private key corresponding to the network server public key; and
comparing the decrypted network password or portions thereof to information maintained by the network server in order to verify user identity and/or determine network privileges accorded to the network password.

2. The method of claim 1, further comprising the step of:

enabling or blocking access to a secured network resource in response to the result of said step of comparing the decrypted network password to information maintained by the network server.

3. The method of claim 2, wherein said step of enabling or blocking access to a secured network resource comprises encrypting and decrypting the specified data maintained in the network server based upon the decrypted network password.

4. The method of claim 1, wherein said step of providing a user password to the network node is performed while the network node is in a system management mode.

5. The method of claim 4, wherein the network password is stored in system management memory.

6. The method of claim 1, further comprising the step of appending node identification information to the network password prior to encrypting the network password and communicating the encryted network password to the network server.

7. The method of claim 6, wherein said step of comparing the network password or portions thereof to information maintained by the network server includes limiting access to specified data based upon the decrypted network password and appended node identification information.

8. The method of claim 1, wherein said step of encrypting the user password with the cryptographic algorithm and the encryption key occurs in the token.

9. The method of claim 1, wherein said step of providing the user password to the cryptographic algorithm comprises downloading both the cryptographic algorithm and the user password to the secure computer memory while in the secure operating mode, and wherein said step of encrypting the user password with the cryptographic algorithm and the encryption key occurs while in the secure operating mode.

10. The method of claim 1, wherein the token is a smart card.

11. The method of claim 1, wherein the token is a Touch Memory™ device.

12. The method of claim 1, wherein the encryption key is unique or of limited production.

13. A computer system capable of securely providing two-piece user authentication data over a computer network, the computer system including capabilities for operating in conjunction with an external token containing a cyptographic algorithm and an encryption key, the computer system comprising:

a system bus;

a secure memory coupled to said system bus, said secure memory independent from a general memory of the computer system;

a processor coupled to said system bus, said processor having a secure operating mode associated with said secure memory and independent from a general operating mode of said processor;

token interface circuitry coupled to said processor for communicating with the external token;

network interface circuitry allowing said processor to direct communications to a network server; and security code stored in a processor readable medium, said security code and said processor readable medium configured for access and execution during the secure operating mode, said security code when executed by said processor causing the processor to perform the steps of:

receiving a user password;

providing the user password to the external token;

receiving a network password from the external token, wherein the network password is an encrypted version of the user password;

storing the network password within said secure memory;

encrypting the network password stored in said secure memory using a network server public key creating an encrypted network password; and communicating the encrypted network password to the network server via said network interface circuitry to allow the computer user to access secured network resources.

14. The computer system of claim 13, wherein said security code is executed while the computer system is in system management mode.

15. The computer system of claim 13, wherein said secure operating mode is entered during a secure power-on procedure.

16. The computer system of claim 13, wherein said security code when executed further causes said processor to append node identification information to the network password prior to said step of communicating the network password to the network server.

17. The computer system of claim 13, wherein the external token is a smart card.

18. The computer system of claim 13, wherein the external token is a Touch Memory™ device.

19. The computer system of claim 13, wherein the encryption key is unique or of limited production.

20. A system capable of securely providing two-piece user authentication data over a computer network, the system including capabilities for operating in conjunction with an external token containing a cryptographic algorithm and an encryption key, the system comprising:

a computer system including:

a system bus;

a secure memory coupled to said system bus, said secure memory independent from a general memory of the computer system;

a processor coupled to said system bus, said processor having a secure operating mode associated with said secure memory and independent from a general operating mode of said processor;

token interface circuitry coupled to said processor for communicating with the external token;

network interface circuitry coupling said processor to the computer network; and a security code stored in a processor readable medium, said security code and said processor readable medium configured for access and execution during the secure operating mode, said security code when executed by said processor causing the processor to perform the steps of:

receiving a user password;

providing the user password to the external token;

receiving a network password from the external token, wherein the network password is an encrypted version of the user password;

storing the network password within said secure memory;

encrypting the network password stored in said secure memory using a public key creating an encrypted network password; and communicating the encrypted network password to the computer network via said network interface circuitry; and a network resource comprising:

an interface coupled to the computer network suitable for communicating with said computer system and receiving the encrypted network password; and executable code in readable media, the code, when executed, performing the steps of:

decrypting the encrypted network password using a private key corresponding to the public key; and comparing the decrypted network password or portions thereof to information maintained by the network server to verify user identity and/or determine network privileges accorded to the network password.

* * * * *

UNITED STATES PATENT AND TRADEMARK OFFICE
CERTIFICATE OF CORRRECTION

PATENT NO. : 5,953,422
DATED : September 14, 1999
INVENTOR(S) : Michael F. Angelo, et al.

It is certified that error appears in the above-identified patent and that said Letters Patent is hereby corrected as shown below:

On the title page, item [56] add the following:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 5 | 1 | 4 | 6 | 4 | 9 | 9 | 09/08/92 | Geffrotin | 380 | 23 | 10/22/90 |
| | | 5 | 2 | 3 | 7 | 6 | 1 | 4 | 08/17/93 | Weiss | 380 | 23 | 06/07/91 |
| | | 5 | 4 | 9 | 7 | 4 | 2 | 1 | 03/05/96 | Kaufman, et al | 380 | 23 | 09/28/94 |
| | | 5 | 5 | 4 | 8 | 7 | 2 | 1 | 08/20/96 | Denslow | 395 | 187.01 | 04/28/94 |

OTHER DOCUMENTS(Including Author, Title, Date, Pertinent Pages, Etc.)

| |
|---|
| Jewelry for the information age, IW Magazine, September 18, 1995, page 49 |
| European Search Report for EP 97 31 0653, 2 pages |

Signed and Sealed this

Eleventh Day of April, 2000

*Attest:*

Q. TODD DICKINSON

*Attesting Officer*  *Director of Patents and Trademarks*